(12) United States Patent
Cockeram

(10) Patent No.: US 9,540,286 B2
(45) Date of Patent: Jan. 10, 2017

(54) HIGH PRESSURE LOW TEMPERATURE HOT PRESSING METHOD FOR PRODUCING A ZIRCONIUM CARBIDE CERAMIC

(71) Applicant: United States Department of Energy, Washington, DC (US)

(72) Inventor: Brian V. Cockeram, North Huntingdon, PA (US)

(73) Assignee: U.S. Department of Energy, Washington, DC (US)

( * ) Notice: Subject to any disclaimer, the term of this patent is extended or adjusted under 35 U.S.C. 154(b) by 89 days.

(21) Appl. No.: 14/182,844

(22) Filed: Feb. 18, 2014

(65) Prior Publication Data

US 2014/0239559 A1 Aug. 28, 2014

Related U.S. Application Data

(60) Provisional application No. 61/768,840, filed on Feb. 25, 2013.

(51) Int. Cl.
*C04B 35/645* (2006.01)
*C04B 35/56* (2006.01)

(52) U.S. Cl.
CPC ......... *C04B 35/645* (2013.01); *C04B 35/5622* (2013.01); *C04B 2235/6562* (2013.01); *C04B 2235/6565* (2013.01); *C04B 2235/77* (2013.01); *C04B 2235/786* (2013.01)

(58) Field of Classification Search
CPC ............... C04B 35/5622; C04B 35/645; C04B 35/6455; C04B 2235/661
See application file for complete search history.

(56) References Cited

U.S. PATENT DOCUMENTS

| 5,750,450 A * | 5/1998 | Bull | ..................... C04B 35/5622 |
| | | | 501/91 |
| 6,843,943 B1 * | 1/2005 | Adolfsson | ............... A61L 27/12 |
| | | | 264/16 |
| 2014/0004271 A1 * | 1/2014 | Allemand | ........... C04B 35/5622 |
| | | | 427/446 |

FOREIGN PATENT DOCUMENTS

FR  WO 2012055865 A1 *  5/2012  ......... C04B 35/5622

OTHER PUBLICATIONS

Chaplygin et al., Effect of Sintering Atmosphere on the Quality of Powder Metallurgical Hard Alloys Containing Zirconium and Hafnium Carbides, Poroshkovaya Met, No. 8 (116), (1972), pp. 81-84.
Deryavko et al., Macrostresses in Sintered Carbides, Poroshkovaya Met, No. 5 (257), (1984), pp. 60-64.
Anan'in et al., Effect of Shock Waves on Refractory Compounds, Poroshkovaya Met, No. 10 (142), (1974), pp. 100-104.
Nezhevenko et al., Influence of the Density of Zirconium Carbide Compacts on the Density of Sintered Specimens, Poroshkovaya Met, No. 1, (1968), pp. 14-16.

(Continued)

*Primary Examiner* — Erin Snelting
(74) *Attorney, Agent, or Firm* — Michael J. Badagliacca; Robert T. Burns; Brian J. Lally

(57) ABSTRACT

A method for producing monolithic Zirconium Carbide (ZrC) is described. The method includes raising a pressure applied to a ZrC powder until a final pressure of greater than 40 MPa is reached; and raising a temperature of the ZrC powder until a final temperature of less than 2200° C. is reached.

3 Claims, 4 Drawing Sheets

(56) References Cited

OTHER PUBLICATIONS

Kushtalova I. P., Investigation of the Sintering of Loosely Poured Titanium Carbide and Zirconium Carbide Powders, Poroshkovaya Met, No. 8 (56), (1967), pp. 7-9.

Rempel et al., Preparation of Disordered and Ordered Highly Nonstoichiometric Carbides and Evaluation of their Homogeneity, Physics of the Solid State, vol. 42 (7), (2000), pp. 1280-1286.

Gropyanov V.M., Effect of Dispersion on Powder Sintering, Ogneupory, No. 12, (1969), pp. 46-52.

Kruglov et al., Effect of Structure and Substructure on the Strength of Sintered Zirconium Carbide Specimens, Poroshkovaya Met, No. 1 (193), (1979), pp. 59-64.

Lanin et al., Non-Isothermal Sintering Parameters and their Influence on the Structure and Properties of Zirconium Carbide, Ceramics International, vol. 17, (1991) pp. 301-307.

Lanin et al., Zirconium Carbide Recrystallization, Poroshkovaya Met, No. 2 (278), (1985), pp. 86-92.

Andrievskii et al., Effect of Structural Vacancies in Interstitial Phases on their Sintering Shrinkage, Poroshkovaya Met, No. 6 (174), (1977), pp. 22-26.

Ordan'yan et al., Isothermal Sintering Kinetics of Zirconium Carbide, Poroshkovaya Met, No. 12 (180), (1977), pp. 57-61.

Bulychev et al., The Sintering of Zirconium Carbide, Poroshkovaya Met, No. 4 (172), (1977), pp. 38-42.

Pierson H. O., Handbook of Refractory Carbides and Nitrides, Noyes Publications, Westwood, NJ (1996), p. 67.

Gorinskii et al., Thermophysical Properties of Hot-Pressed TiC—C and ZrC—C Composite Materials at High Temperatures, Poroshkovaya Met, No. 4 (196), (1978), pp. 67-71.

Barnier et al., Hot-Pressing Kinetics of Zirconium Carbide, Materials Science, vol. 21, (1986), pp. 2547-2552.

Lengauer et al., Solid State Properties of Group IVb Carbonitrides, Alloys and Compounds, vol. 217, (1995), pp. 137-147.

Spivak et al., Densification Kinetics in the Hot Pressing and Recrystallization of Carbides, Poroshkovaya Met, No. 11 (131), (1973), pp. 24-30.

Mahday et al., Mechanically Induced Solid State Carburization for Fabrication of Nanocrystalline ZrC Refractory Material Powders, Alloys and Compounds, vol. 299, (2000), pp. 244-253.

\* cited by examiner

HIGH PRESSURE LOW TEMPERATURE HOT PRESSING METHOD FOR PRODUCING A ZIRCONIUM CARBIDE CERAMIC

STATEMENT REGARDING FEDERALLY SPONSORED RESEARCH AND DEVELOPMENT

This invention was made with U.S. Government support under DE-AC11-98FN38206 awarded by the United States Department of Energy. The U.S. Government has certain rights in the invention.

BACKGROUND

1. Field

Embodiments discussed herein relate to a method of making monolithic Zirconium Carbide (ZrC).

2. Description of the Related Art

Zirconium Carbide (ZrC) is a ceramic that is used as tool bits, as a coating layer for nuclear fuel, and in ultra-high temperature (e.g., 3500° C.) applications. The ceramic is also corrosion and water resistant. High density (i.e., greater than 90% of a theoretical density of the ZrC) and small grain sizes (i.e., 1 to 12 μm) are desirable traits for ZrC because these traits lead to good material hardness and mechanical strength. ZrC should have low levels of impurities and a stoichiometric ratio that is approximately $ZrC_{1.0}$.

Related methods for making monolithic discs of ZrC include "sintering" and "hot press", but these methods have limitations. For the hot press method to produce ZrC with 90% density, very high temperatures, i.e., 2200 to 2700° C., are required. Even when high temperatures are used, the produced ZrC has a relatively large grain size (16 to 120 μm). Sintering also requires high temperatures (2200 to 2700° C.) to create monolithic discs. The result is a monolithic disc of ZrC with relatively large grain size (20 to 65 μm) and low density (70 to 90%).

Both processes produce monolithic discs of ZrC with large grain sizes. Large grain sizes correspond to reduced material hardness and mechanical strength. Both processes require relatively high energy to meet the high temperature requirements.

In light of the foregoing, there is a need for a method of making monolithic ZrC having high density (i.e. above 90%) and small grain sizes (1 to 12 μm).

SUMMARY

To solve the above problems, other problems, or both, it is an aspect of the described embodiments to provide a method of producing monolithic ZrC, including raising a pressure applied to a ZrC powder until a final pressure of greater than 40 MPa is reached; and raising a temperature of the ZrC powder until a final temperature of less than 2200° C. is reached.

To solve the above problems, other problems, or both, it is an aspect of the described embodiments to provide a method of producing monolithic ZrC, including raising a temperature of a ZrC powder to a temperature of less than 2200° C., a density of the monolithic ZrC being 96%-98% of a theoretical density.

To solve the above problems, other problems, or both, it is an aspect of the described embodiments to provide a method of producing monolithic ZrC, the ZrC having a grain size of less than 12 microns.

Additional aspects, advantages, or both will be set forth in part in the description which follows and in, in part, will be apparent from the description, or may be learned by practice thereof.

BRIEF DESCRIPTION OF THE DRAWINGS

These or other aspects and advantages or both will become more readily appreciated from the following description of embodiments, taken in conjunction with the accompanying drawings in which.

EMBODIMENTS

Figure 1:
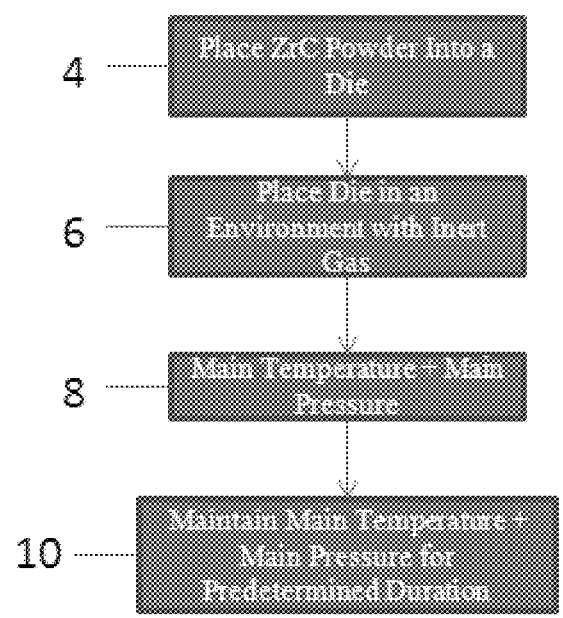
FIG. 1 is a flow chart illustrating a method of making monolithic ZrC according an embodiment.

Embodiments are described below, examples of which are illustrated in the accompanying drawings, wherein like reference numerals refer to the like elements throughout. Although a few embodiments have been shown and described, those skilled in the art will appreciate that changes may be made in these embodiments without departing from the principles and spirit of the embodiments, the scope of which is defined in the appended claims and their equivalents.

FIG. 1 is an illustration of a method of making monolithic ZrC according to an embodiment. ZrC powder (for example, 99.5% pure and average particle size≤10 μm) is placed into a die (Operation 4). As an example, sufficient ZrC powder is added to produce a final pressed thickness of 0.15 to 0.8 inches. Next, the die is placed in an environment with inert gas (Operation 6). Next, a pressure of 55 to 60 MPa (main pressure) is applied to the ZrC and the temperature of the ZrC is held between 1800 and 2200° C. (main temperature) (Operation 8). The temperature and pressure are held for three hours (Operation 10). These temperature, pressure and times are merely non-limiting examples.

The resulting hot-pressed ZrC has relatively small grain sizes (1-12 microns), thereby resulting in improved strength and damage resistance. Also, the density of the resulting hot-pressed ZrC is 96%-98% of a theoretical density.

Figure 2:
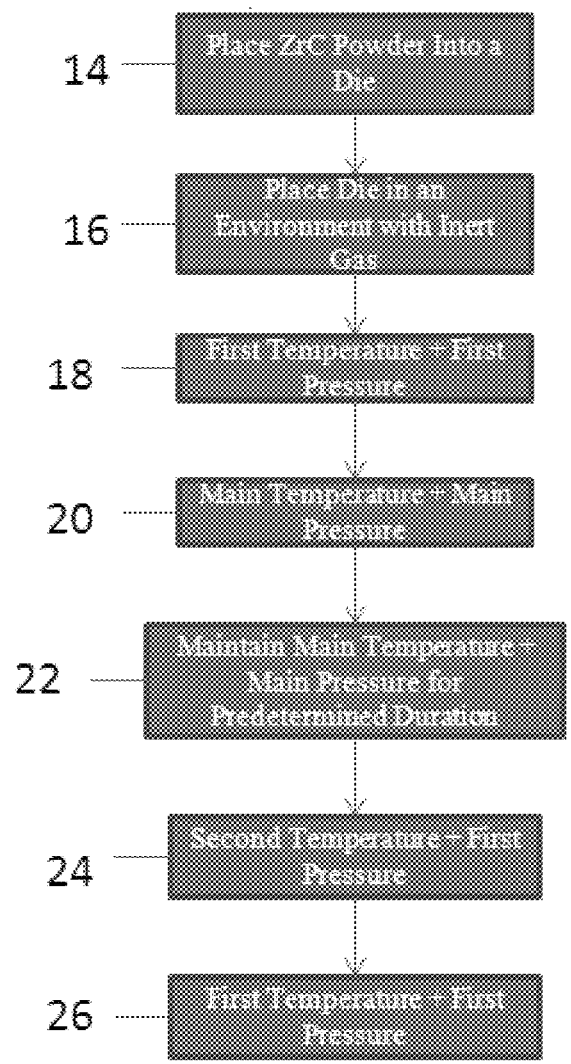
FIG. 2 is a flow chart illustrating a method of making monolithic ZrC, including a cooling process, according to an embodiment.

FIG. 2 is an illustration of a method of making monolithic ZrC according to another embodiment. ZrC powder is placed into a die (Operation 14). For example, ZrC powder is added to produce a final pressed thickness of 0.15 to 0.8 inches, however, other thicknesses may be possible. At Operation 16, the die is placed in an environment with an inert gas. The ZrC is initially at room temperature and atmospheric pressure (Operation 18). The pressure of the ZrC is raised to 55 to 60 MPa 20 and the temperature of the ZrC is raised to 1800 and 2200° C. (Operation 20). The temperature (1800 to 2200° C.) and pressure (55 to 60 MPa) are held for three hours 22. Once three hours elapses, pressure is removed from the ZrC, and the pressure of the ZrC returns to atmospheric pressure (Operation 24). The temperature is then reduced to an intermediate cooling temperature 1000° C. at a rate of 100° C./hr (Operation 24). Once the temperature of the ZrC reaches 1000° C., it is then cooled down to room temperature (Operation 26). It is noted that these temperature, pressure and times are merely non-limiting examples.

The resulting hot-pressed ZrC has relatively small grain sizes (1-12 microns), thereby resulting in improved strength and damage resistance. Also, the density of the resulting hot-pressed ZrC is 96%-98% of a theoretical density.

Figure 3:
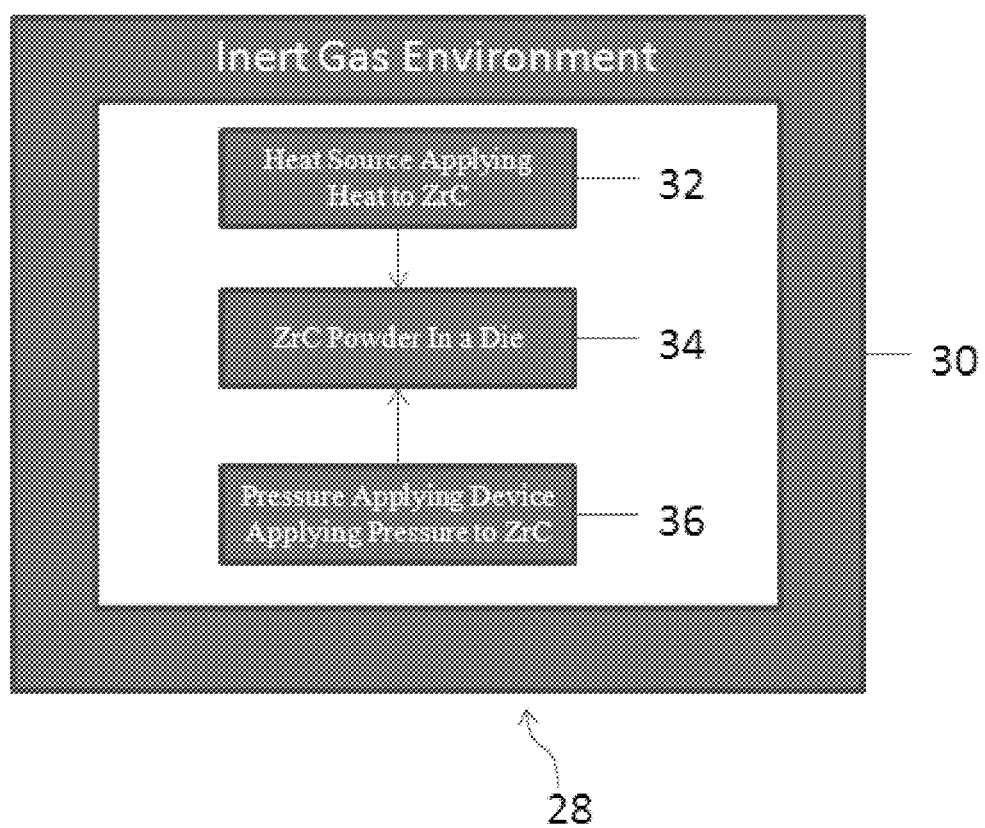
FIG. 3 is an illustration of the equipment in an inert gas environment according to an embodiment.

FIG. 3 is an illustration of the apparatus 28 used in connection with the method of FIG. 1. The apparatus includes a die 34, a heat source 32 (for example, a 10 KHz, 50 KW RF generator), and a pressure applying device 36 (for example, a 100-ton hydraulic press). The die 34 and heat source 32 are located in a container 30 filled with an inert gas (e.g., argon).

Figure 4:
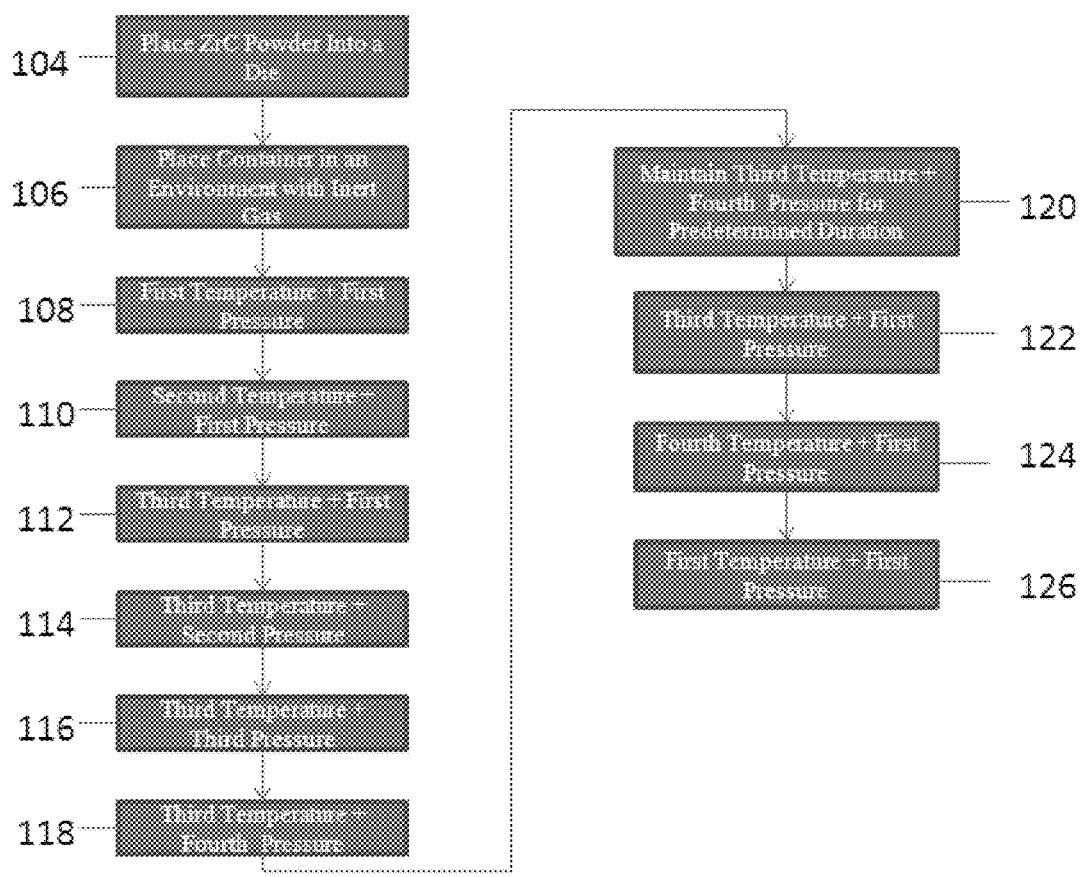
FIG. 4 is a flow chart illustrating a method of making monolithic ZrC that includes a heating, pressure raising, cooling, and pressure reduction stage, according to an embodiment.

FIG. 4 is an illustration of a method of making monolithic ZrC by gradually raising the temperature and pressure, maintaining a pressure and temperature, and then gradually cooling the end-product according an embodiment. ZrC powder is placed into a die (Operation 104). At Operation 106, the die is placed in a container with an inert gas. As an example, ZrC with thickness of 0.15 to 0.8 inches may be used. Initially, ZrC powder is at room temperature and its pressure is approximately 11 to 11.7 Mega Pascals (MPa) (Operation 108). The temperature of the ZrC increases from room temperature to 1000° C. at a rate of 2000° C./hr (Operation 110). Temperature rises from 1000° C. to 1900° C. at a rate of 2000° C./hr (Operation 112). Pressure is raised from 11 to 11.7 MPa to 21.4 to 22 MPa at a rate of 0.28 MPa/min (Operation 114). Once 21.4 to 22 MPa is reached, pressure is increased to 49 to 51 MPa at a rate of 0.84 MPa/min (Operation 116). Finally, pressure is increased to 55.8 to 60 MPa at a rate of 0.28 MPa/min (Operation 118). The final pressure and temperature are maintained, for example, for approximately three hours (Operation 120). After three hours, the pressure is removed and the pressure of the ZrC goes back to atmospheric pressure (Operation 122). Temperature is then reduced to 1000° C. at a rate of 100° C./hr (Operation 124). When 1000° C. is reached, the setup is cooled to room temperature (Operation 126). It is noted that these temperature, pressure and times are merely non-limiting examples.

The resulting hot-pressed ZrC has relatively small grain sizes (1-12 microns), thereby resulting in improved strength and damage resistance. Also, the density of the resulting hot-pressed ZrC is 96%-98% of a theoretical density.

What is claimed is:

1. A method of producing hot-pressed monolithic ZrC, comprising:
   raising a pressure applied to a powder consisting of ZrC of 99.5% purity until a final pressure of 40 to 60 MPa is reached;
   raising a temperature of the ZrC powder until a final temperature between 1800 and 2200° C. is reached;
   placing the ZrC powder and an inert gas into a container;
   forming a grain size of the monolithic ZrC of less than 12 microns; and
   compressing the monolithic ZrC to 96%-98% of a theoretical density, wherein the raising the pressure further comprises:
   raising the pressure at a first rate until a first pressure is reached;
   maintaining the first pressure;
   raising the pressure at a second rate until a second pressure is reached;
   raising the pressure at a third rate until a third pressure is reached; and
   raising the pressure at a fourth rate until the final pressure is reached.

2. The method of claim 1, wherein the raising the temperature of the ZrC powder further comprises:
   raising the temperature of the ZrC powder to a first temperature;
   maintaining the first temperature; and
   raising the temperature of the ZrC powder to the final temperature.

3. The method of claim 2, further comprising maintaining the final pressure and the final temperature simultaneously.

* * * * *